(12) United States Patent
Borodich

(10) Patent No.: US 8,190,711 B1
(45) Date of Patent: May 29, 2012

(54) METHOD AND SYSTEM FOR CONTROLLING AND TRACKING CONTENT DISTRIBUTION

(76) Inventor: Alexander Borodich, Moscow (RU)

( * ) Notice: Subject to any disclaimer, the term of this patent is extended or adjusted under 35 U.S.C. 154(b) by 286 days.

(21) Appl. No.: 12/538,184

(22) Filed: Aug. 10, 2009

Related U.S. Application Data

(60) Provisional application No. 61/087,719, filed on Aug. 10, 2008.

(51) Int. Cl.
*G06F 15/16* (2006.01)
(52) U.S. Cl. ............. 709/219; 709/225; 705/20; 705/51
(58) Field of Classification Search .................... 709/219
See application file for complete search history.

(56) References Cited

U.S. PATENT DOCUMENTS

| | | | |
|---|---|---|---|
| 6,772,208 B1* | 8/2004 | Dutta | 709/225 |
| 7,873,541 B1* | 1/2011 | Klar et al. | 705/20 |
| 2007/0180523 A1* | 8/2007 | Jablonski et al. | 726/22 |
| 2008/0281754 A1* | 11/2008 | Kelley et al. | 705/39 |

OTHER PUBLICATIONS

Remenyi, "Effective website findability", 2004, MCIL, all pages, http://www.mcil.co.uk/review/7-website-findability.htm.*

* cited by examiner

*Primary Examiner* — Hua Fan
(74) *Attorney, Agent, or Firm* — Bardmesser Law Group

(57) ABSTRACT

A method, system and computer program for controlling propagation of content throughout the Internet, social and mobile networks. Publisher's content is assigned a unique identifier in a form of a URI (Uniform Resource Identifier) or a URL (Uniform Resource Locator). The unique identifier is modified each time the content is accessed by a user. The content parameters in the identifier are modified in order to keep track of number of accesses to the content by users. By changing the parameters assigned to the content, a publisher or an advertiser can determine a number of recipients of the content and keep track of the entire process of content distribution and its propagation throughout a network.

14 Claims, 6 Drawing Sheets

METHOD AND SYSTEM FOR CONTROLLING AND TRACKING CONTENT DISTRIBUTION

CROSS-REFERENCE TO RELATED APPLICATIONS

This application is a non-provisional of U.S. Provisional Patent Application No. 61/087,719, filed on Aug. 10, 2008, entitled METHOD AND SYSTEM FOR CONTROLLING CONTENT DISTRIBUTION, which is incorporated by reference herein in its entirety.

BACKGROUND OF THE INVENTION

1. Field of the Invention

The present invention is related to Internet web development, and more particularly, to a method, system and computer program product for controlling and tracking content distribution through various networks.

2. Background Art

A wide adoption of various networks, such as web-based and mobile-based social networks, raises issues related to propagation of information throughout the network. Typically, when a member of a network receives some information content or a link to some content of interest, he sends it to other members of his social group or network. Presumably, members of the same network (such as, a social group, a virtual community, a social network, etc.) may have similar interests and the content of interest can propagate very deep into a network. A general scheme of content propagation through the Internet or a network is shown in FIG. 1.

A publisher (i.e., an advertiser or a producer of content) can determine how many people have initially received his content as a result of a targeted broadcast or a mass mailing. However, the advertiser has no control over subsequent propagation of his content to other members of a network.

Thus, the advertiser cannot judge an effectiveness of his advertising campaign, since he only has information about the initial recipients of his content and has no information about how his content travels throughout the Internet or various networks or groups the initial recipients are associated with. In order to provide effective advertising over the Internet or over mobile networks, an advertiser needs to have a control over the propagation and spread of his content.

Accordingly, there is a need in the art for an effective method and system for controlling and tracking the propagation of content over the Internet and throughout social networks.

SUMMARY OF THE INVENTION

Accordingly, the present invention is related to Internet web development, and more particularly, to a method, system and computer program product for controlling content distribution through various networks that substantially obviates one or more of the disadvantages of the related art.

In one embodiment, there is provided a method and computer program product for controlling propagation of content throughout the Internet. According to an exemplary embodiment, publisher's content is assigned a unique identifier in a form of URI (Universal Resource Identifier) or URL. The unique identifier is modified each time the content is accessed by a user. The content parameters of the unique identifier are modified in order to keep track of a number of accesses to the content by users and the information about propagation through the Internet and about connections between the users.

The content parameters that are modified in the exemplary embodiment are: a content source (i.e., origin of content), a unique user_id, date of a last access, advertisement campaign_id, a content referrer, etc. By changing the parameters assigned to the content, a publisher or an advertiser can not only determine a number of recipients of the content, but keep track of the entire process of content distribution and its propagation through a network.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

According to the exemplary embodiment, there is provided a method, system and computer program product for controlling propagation of content throughout the Internet or social networks. The publisher's content (i.e., advertisement) is assigned a unique identifier in a form of URI or URL. Then, a unique identifier of the content is modified each time the content is accessed by a new user.

The content parameters included in the URL are modified in order to keep track of number of accesses of the content by users and the content propagation throughout the Internet. According to the exemplary embodiment, content parameters can be a content source (i.e., origin of content), a unique user_id, a date of a last access, an advertising campaign_id, a content referrer, etc. Whenever at least one of these parameters is changed, a content provider (i.e., a publisher or an advertiser) knows that a particular content has been accessed.

Figure 1:
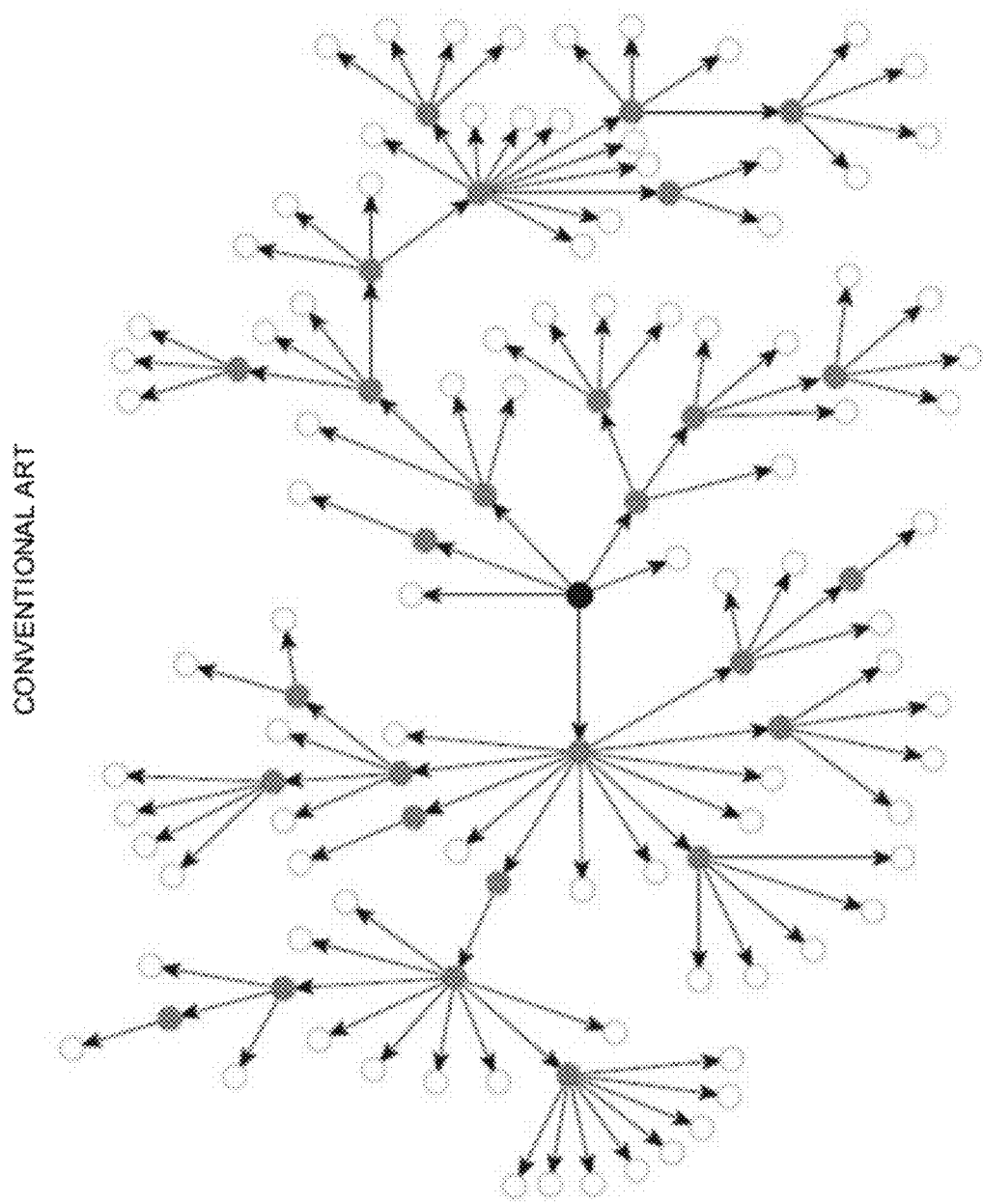
FIG. 1 illustrates conventional propagation of content throughout social networks.

Thus, the content provider can not only determine a number of recipients of the content, but keep track of the entire process of content distribution and propagation throughout a network as illustrated in FIG. 1. The content is received by the recipients represented by large nodes, and then the content is referred to other members of a network or to other recipients that can get the link from those senders who distributed the link to the content throughout the Internet.

In one embodiment, the unique content id assigned by a publisher is coded into the address of a web page that provides the content. The web page address changes each time the content is accessed. This approach has its advantages in mobile networks, where users typically exchange links to web pages. In yet another embodiment, the unique content id can be coded into the URL of the content itself. Thus, so-called "short links" that can be used for sending the content over digital TV networks and mobile networks. This short URL will redirects the user to a page, where the URL is decoded in from the shorter version of the initial URL. The present invention permits incorporation of the URL-modified algorithm into such URL-shortening service, to analyze the propagation of the URL via internet and mobile networks. For example, if the user selects the URL http:u42.me/5815c/, he will be instead taken to http:u42.me/4-db94/. Thus, the user will not know the actual address of the content he got from TV network, mobile network or internet. Each time when the user sends the content to someone else, this address will be modified as described. Note that the present invention is equally applicable to short links, permitting compressing the link to just 19 symbols, where the original link was about 100 symbols.

As content travels throughout a social or a mobile network or from user to user, its effectiveness, in terms of a particular target audience, can be estimated by a percentage of referrals of the content made by members at every level of network propagation. To measure the efficiency of advertising campaigns in various networks, certain characteristics (i.e., parameters) must be examined. According to the exemplary embodiment, the content can be a video file, an image, a flash object or a hyperlink.

The exemplary parameters are: (a) a total number of individuals (nodes) in a network or a sub network, (b) an average number of connections per node, (c) a number of "super-connected" nodes (i.e., nodes that have a significantly higher number of connections than others) and (d) the influence these "super-connected" nodes have on other nodes in the network. The influence of the "super-connected" nodes depends on the amount of trust other members in the network put in these nodes as a reliable source of information. In other words, the influence of the "super-connected" nodes can be measured by a number of the recipients that receive information from these nodes.

The proposed model for calculating parameters of effective penetration, in conjunction with a numerical evaluation of the trust factor of a particular node of a network, allows conducting an accurate analysis of the effectiveness of a given advertising campaign. The method gives a visual representation of the propagation path, the number of affected nodes, the number of nodes that actively pass on the content and the speed of spread (or propagation) of the content.

A plurality of trees reflecting the propagation of the advertisement content can be generated. Using these trees (and sub-trees) the effectiveness of the content can be estimated. Additionally, the content can have an option that allows a recipient to make a comment or simply indicate that he likes or dislike the content. In other words, the proposed method advantageously provides a feedback mechanism for advertiser running a particular campaign.

Figure 2A:
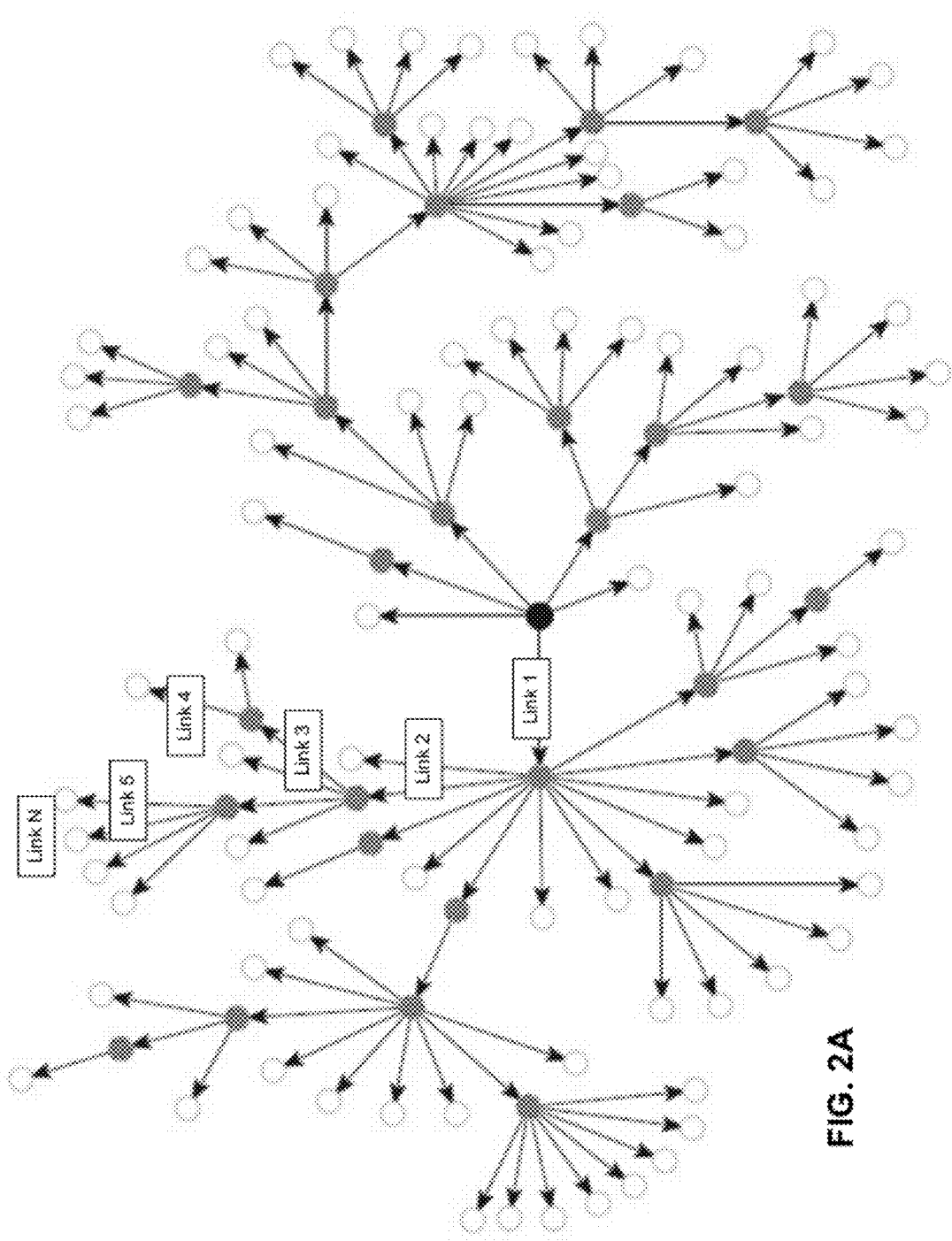
FIGS. 2A-2B illustrate propagation of content using links, in accordance with the exemplary embodiment.
Figure 2B:
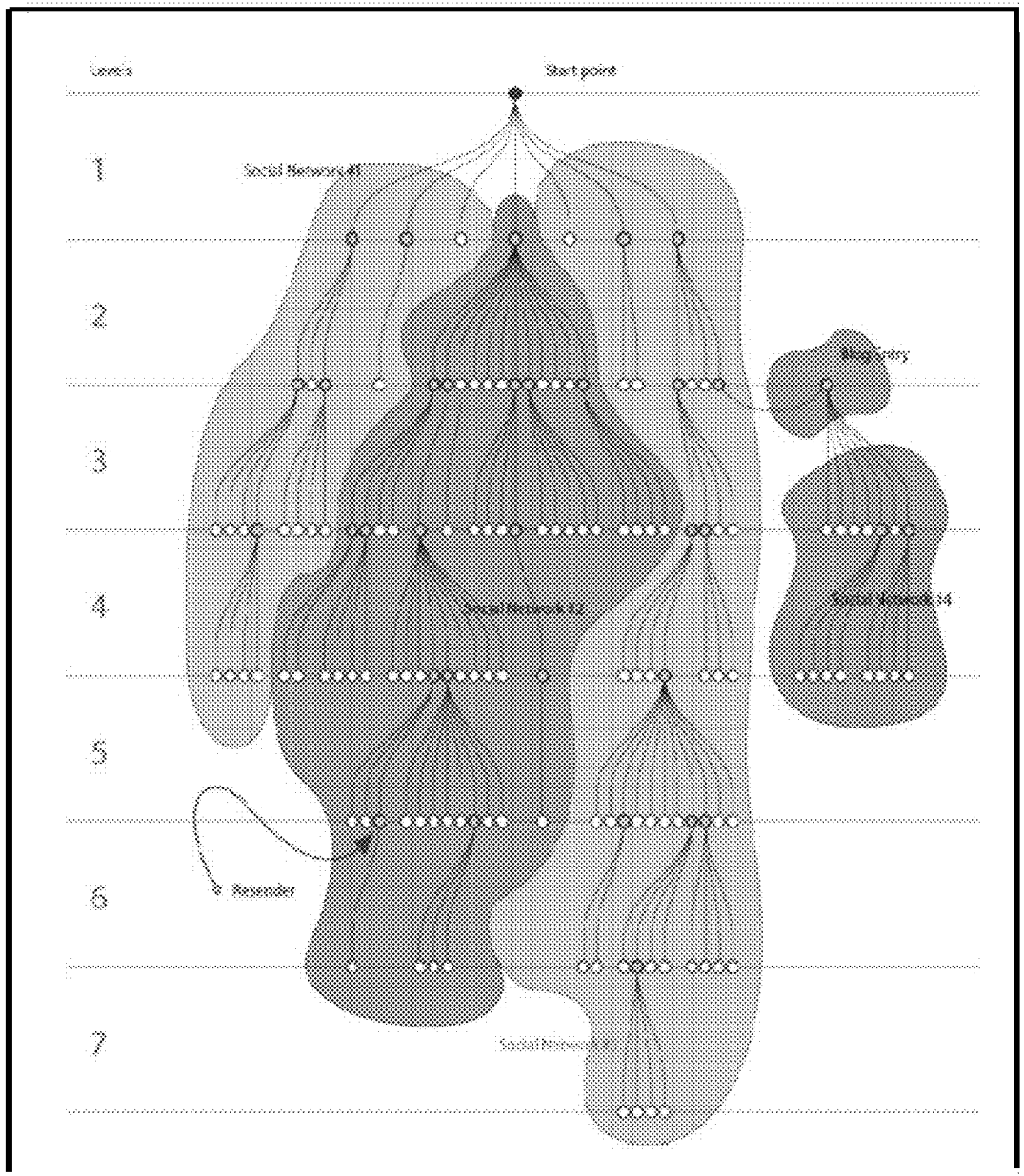

By using the proposed model for continuous evaluation of propagation of advertising campaigns conducted within the same network or a plurality of the networks (i.e., target audience), it is not only possible to evaluate the effectiveness of specific campaigns, but also to build a model of the community or communities of interest. The statistical data about community of interests can be generated by analyzing the propagation trees and especially the areas of crosspollination between these trees. Thus, an accurate prediction of the effectiveness of future communications and campaigns can be made. FIGS. 2A and 2B illustrate propagation of the content in the exemplary social network using links that are modified each time the content is accessed.

The exemplary network illustrated in FIG. 2A has somewhat random structure with multidirectional propagation of the content. This can represent, for example, spreading of the content over the Internet. The network depicted in FIG. 2B is the structured social network where content propagation occurs in one direction from the nodes of a higher level to the nodes of lower levels.

Figure 3:
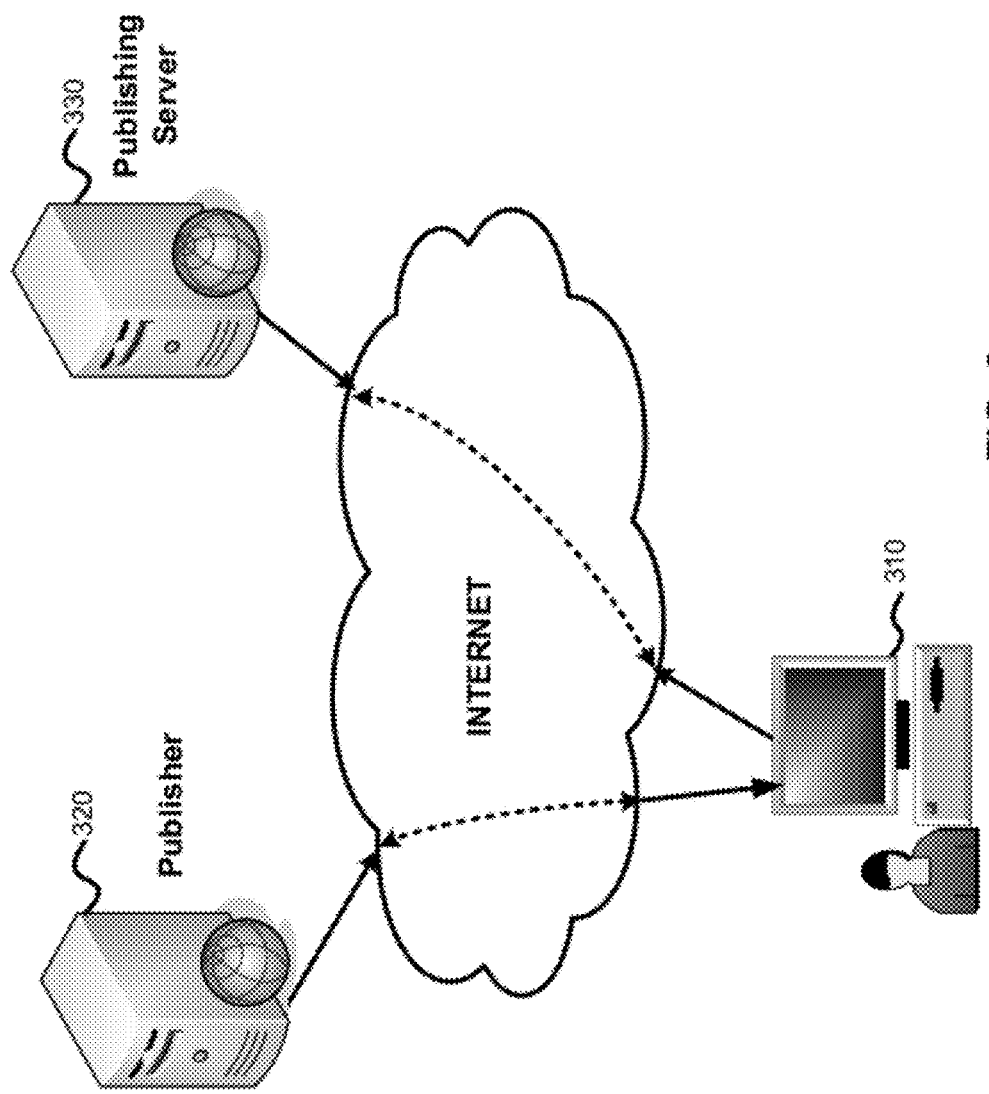
FIG. 3 illustrates an exemplary system for monitoring content distribution.

An exemplary system for providing and monitoring content distribution is illustrated in FIG. 3. A content is provided to a user 310 from a content provider (i.e., publisher) 320. The content can be provided in a form of a link (i.e., a URL or a URI) to a location of the content. The user 310 accesses the content on a content server (i.e., publishing web server) 330 at the location specified by the URL (or the URI). The URL (or the URI) is modified by the server 330 at the time the user 310 accesses the content. If the user refers the URL (or the URI) to another user or posts the content on the Internet, the URL (or the URI) is modified when this user or a new user accesses the content.

Thus, the server 330 can collect statistical data pertaining to the content access by different users. Information about each access attempt is recorded by the server 330. This information can include data about the user and the subsequent referrals to the content made by the users. Those of ordinary skill in the art will appreciate that proposed method provides for effective monitoring of the content distribution throughout a network and collecting comprehensive statistics that can be used for determining the overall effectiveness of an advertising campaign. The proposed method can also help to create a structural model reflecting internal links between the users.

According to the exemplary embodiment, the advertisement content is generated and placed on a content server. A link to the content is provided to an initial set of recipients (i.e., members of a social network or a group or a selected set of users). The link is defined by the parameters of the content as follows:

Link=f(campaign_id, network, content, source, date . . . ).
A targeted social or mobile network is defined by network parameter in the link. The initial recipients receive a link. Thus, the initial (i.e., the highest) level of a social network is propagated. The recipients make attempts to access the content defined by the link by making a request to the content server. At this point, the link to the content is modified by the server as follows:

Mlink=f(linkN−1, source, user_id, campaign_id, network, content . . . ).

The initial recipient receives the content at the modified link. If the initial recipient finds the content to be of interest, he sends the modified link to other members of his social network. Thus, a second level of the content propagation is implemented and tracked. When the recipient at the second level accesses the content at the modified link, the link is modified again. For example, an initial recipient was sent a link http://A.com/promo/1/. When he accesses the content at the content server, this link is automatically modified to http://A.com/promo/2/and then again modified to http://A.com/promo/3/.

In order to maintain the integrity of the modified link, the modification can be made to be less obvious to a user. For example, a value being modified can be represented by a special substring in the middle of the string as in http://A.com/A352E/promo/. The substring that is modified can be hashed to be even less obvious to a user. A database of hashes and their corresponding parameters, users, etc. can be maintained.

Note that in case of content distribution over mobile networks, the content is delivered directly to a recipient and the actual content is modified each time it is provided to a new recipient within the mobile network.

Figure 4:
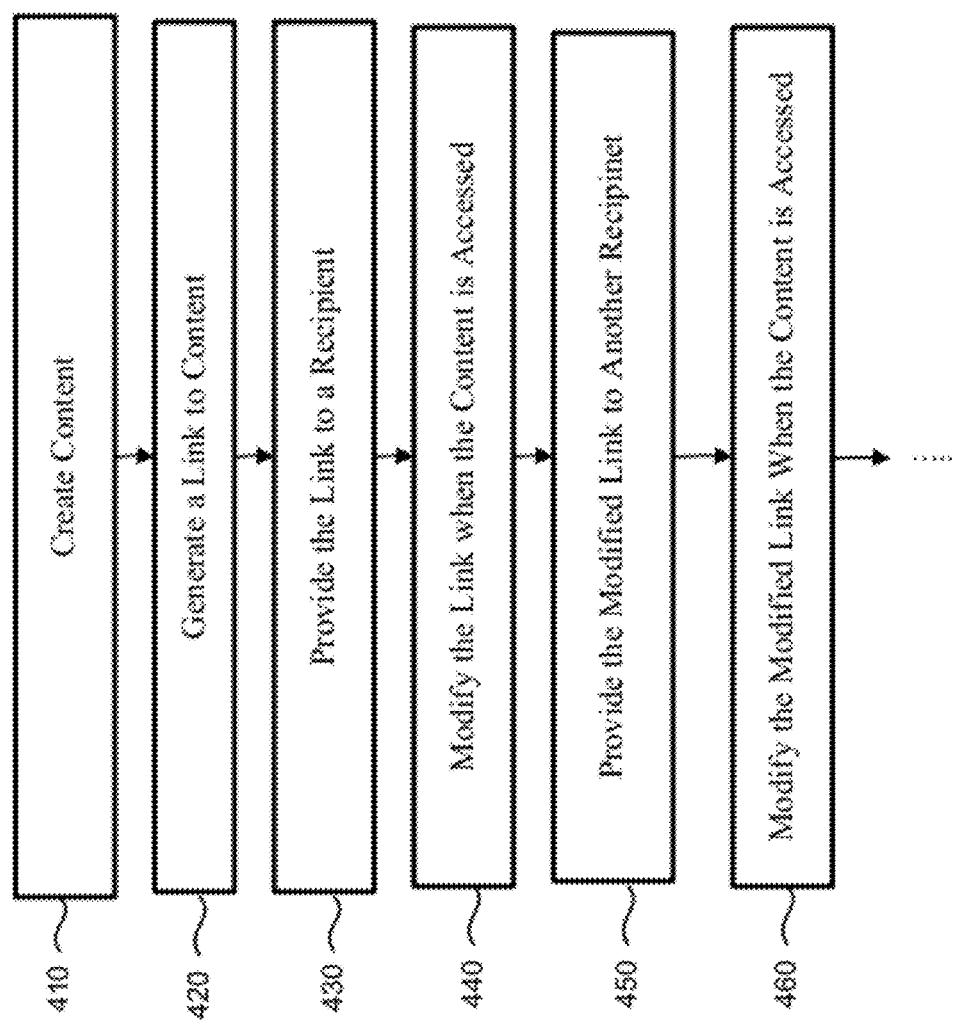
FIG. 4 illustrates a flow chart of a method for controlling content propagation, in accordance with the exemplary embodiment.

A flow chart of a method for monitoring content propagation is illustrated in FIG. 4. Content is created and placed on a content server at step 410. A link to the content is generated at step 420. The link is provided to a recipient at step 430. When the recipient attempts to access the content referenced by the link generated at step 420 on the content server, the link is modified at step 440. Then the modified link is provided to another recipient at step 450. The link is modified again at step 460, when another recipient accesses the content. The steps 450 and 460 are repeated for all subsequent recipients.

The exemplary embodiment can be implemented in social networks and in mobile networks. In the social networks the propagation and effectiveness of a marketing or advertising content can be determined. In mobile networks, the proposed method allows to determine marketing value of a mobile content. It can be also used for market research based on determination of user preferences based on analyses of the mobile content sent by the mobile user.

Figure 5:
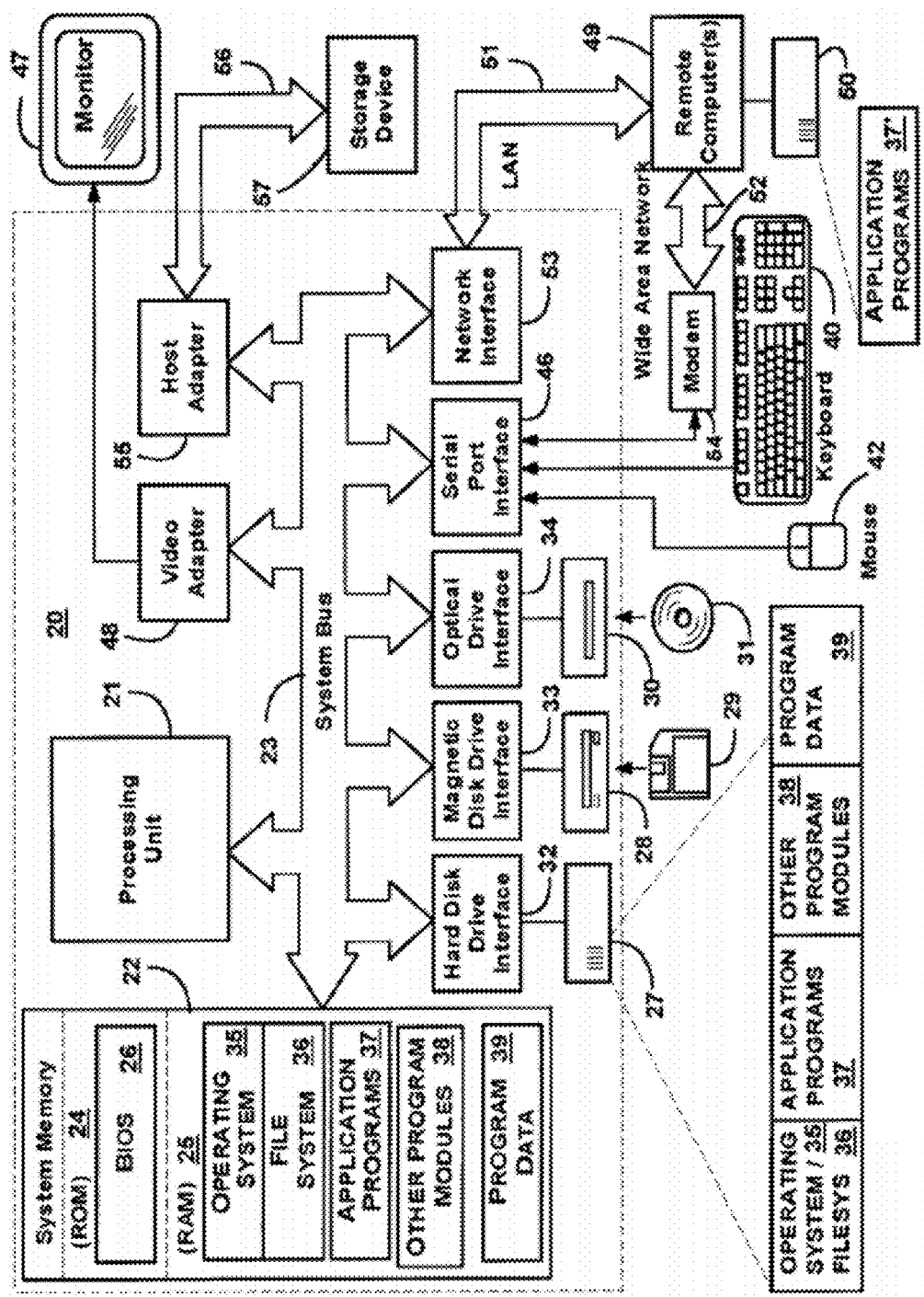
FIG. 5 illustrates an exemplary computer system that can be used for implementing the invention.

With reference to FIG. 5, an exemplary system for implementing the invention includes a general purpose computing device in the form of a computer or server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24.

The computer (or server) 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows™ 2000). The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

The computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated in FIG. 5. The logical connections depicted in FIG. 5 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and computer program product have been achieved.

It should also be appreciated that various modifications, adaptations, and alternative embodiments thereof may be made within the scope and spirit of the present invention. The invention is further defined by the following claims.

What is claimed is:

1. A method for controlling distribution of a content throughout a network, the method comprising:
   on a computer having a microprocessor and a memory, executing the following steps:
   (a) generating the content and placing it on a content server;
   (b) generating a first URL link to the content;
   (c) providing the first URL link to an end user who consumes the content;

(d) modifying the first URL link on the content server when the end user accesses the content using the first URL link;
(e) providing the modified first URL link to another end user;
(f) modifying the modified first URL link on the content server, when the another end user accesses the content using the modified first URL link;
(g) recording all modifications to the first URL link;
(h) repeating steps (e) through (g) for subsequent different end users;
estimating effectiveness of advertising the content based on a percentage of referrals of URL links to the content made by end users at every level of propagation of the content through the network; and
determining efficiency of advertising the content based on any of (i) an average number of connections per network node; (ii) a number of super-connected nodes, wherein each super-connected node has a number of connections that exceeds the average number of connections per network node; and (iii) an influence of the super-connected nodes on other network nodes, the influence measured by a number of end users that receive information from the super-connected nodes.

2. The method of claim 1, wherein the content is any of:
a video file;
an image;
a flash object; and
a hyperlink.

3. The method of claim 1, wherein the first end user, the another end user, and the subsequent different end users belong to a social network.

4. The method of claim 1, further comprising tracking a propagation path of the content throughout network nodes.

5. The method of claim 4, wherein the content propagation path indicates content end users who made referrals to other end users.

6. The method of claim 1, wherein the first URL link to the content is assigned a unique identifier that is modified after each access to the content by another different end user.

7. The method of claim 6, wherein the unique identifier is a URL itself.

8. The method of claim 6, wherein the unique identifier is a URI.

9. The method of claim 6, wherein content parameters are embedded into the unique identifier.

10. The method of claim 9, wherein the content parameters are any of:
a unique content user id;
a date of last content access; and
a content referring end user.

11. The method of claim 10, wherein a modification of at least one of the content parameters indicates an access to the content.

12. The method of claim 1, wherein an identifier of a webpage where the content resides is encoded into the first URL link and all subsequently modified first URL links.

13. The method of claim 1, wherein the first end user, the another end user, and the subsequent different end users belong to any of:
a user group;
a mobile network; and
the Internet.

14. A system for controlling distribution of a content, the system comprising:
a processor;
a memory;
a computer program product stored in the memory and executed on the processor, the computer program product performing:
(a) generating the content and placing it on a content server;
(b) generating a first URL link to the content;
(c) providing the first URL link to an end user who consumes the content;
(d) modifying the first URL link on the content server when the end user accesses the content using the first URL link;
(e) providing the modified first URL link to another end user;
(f) modifying the modified first URL link on the content server, when the another end user accesses the content using the modified first URL link;
(g) recording all modifications to the first URL link;
(h) repeating steps (e) through (g) for subsequent different end users;
estimating effectiveness of advertising the content based on a percentage of referrals of URL links to the content made by end users at every level of propagation of the content through the network; and
determining efficiency of advertising the content based on any of (i) an average number of connections per network node; (ii) a number of super-connected nodes, wherein each super-connected node has a number of connections that exceeds the average number of connections per network node; and (iii) an influence of the super-connected nodes on other network nodes, the influence measured by a number of end users that receive information from the super-connected nodes.

* * * * *